United States Patent
Mark et al.

(10) Patent No.: US 10,599,663 B1
(45) Date of Patent: Mar. 24, 2020

(54) PROTECTED SEARCH

(71) Applicant: Palantir Technologies Inc., Palo Alto, CA (US)

(72) Inventors: Alexander Mark, New York, NY (US); Christopher Richbourg, Arlington, VA (US); James Lu, Washington, DC (US); Joshua Zavilla, Washington, DC (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/448,173

(22) Filed: Mar. 2, 2017

Related U.S. Application Data (60) Provisional application No. 62/434,237, filed on Dec. 14, 2016.

(51) Int. Cl.
| | | |
|---|---|---|
| *G06F 17/30* | (2006.01) | |
| *G06F 16/248* | (2019.01) | |
| *H04L 29/06* | (2006.01) | |
| *G06F 16/951* | (2019.01) | |
| *G06F 16/2458* | (2019.01) | |
| *G06F 16/2457* | (2019.01) | |

(52) U.S. Cl.
CPC ........ *G06F 16/248* (2019.01); *G06F 16/2471* (2019.01); *G06F 16/24575* (2019.01); *G06F 16/951* (2019.01); *H04L 63/101* (2013.01)

(58) Field of Classification Search
None
See application file for complete search history.

(56) References Cited

U.S. PATENT DOCUMENTS

| | | |
|---|---|---|
| 6,980,984 B1 | 12/2005 | Huffman et al. |
| 7,657,540 B1 | 2/2010 | Bayliss |
| 7,899,796 B1 | 3/2011 | Borthwick et al. |
| 7,900,052 B2 | 3/2011 | Jonas |
| 9,348,920 B1 | 5/2016 | Kesin |
| 2002/0083039 A1 | 6/2002 | Ferrari |
| 2007/0011146 A1* | 1/2007 | Holbrook ............ G06F 17/3089 |
| 2007/0130206 A1 | 6/2007 | Zhou et al. |
| 2007/0233685 A1* | 10/2007 | Burns ............... G06F 17/30991 |
| 2008/0071731 A1 | 3/2008 | Ma et al. |
| 2009/0024589 A1 | 1/2009 | Sood et al. |
| 2009/0193016 A1* | 7/2009 | Jones ................ G06F 17/30864 |
| 2010/0114887 A1 | 5/2010 | Conway et al. |
| 2010/0131495 A1* | 5/2010 | Murdock .......... G06F 17/30864 707/722 |
| 2011/0258190 A1 | 10/2011 | Chen et al. |

(Continued)

FOREIGN PATENT DOCUMENTS

EP  3037992  6/2016

*Primary Examiner* — Alex Gofman
(74) *Attorney, Agent, or Firm* — Sheppard Mullin Richter & Hampton LLP (57) ABSTRACT

Systems and methods are provided for protected search. A search query to be performed using at least one data store is received from a computing device of a user. The user is not authorized to access the at least one data store. One or more search results that are responsive to the search query from the at least one data store are determined. The one or more search results are aggregated based on one or more categories. At least a subset of the aggregated search results is provided to the computing device of the user.

13 Claims, 5 Drawing Sheets

(56) References Cited

U.S. PATENT DOCUMENTS

| | | |
|---|---|---|
| 2012/0159312 A1 | 6/2012 | Mital et al. |
| 2012/0254776 A1* | 10/2012 | Corella ................. G06F 3/0481 |
| | | 715/760 |
| 2012/0278273 A1 | 11/2012 | Fang |
| 2013/0304770 A1 | 11/2013 | Boero et al. |
| 2014/0330845 A1 | 11/2014 | Feldschuh |
| 2014/0379755 A1 | 12/2014 | Kuriakose et al. |
| 2015/0220658 A1* | 8/2015 | Mukherjee ........ G06F 17/30693 |
| | | 707/711 |
| 2015/0347769 A1* | 12/2015 | Espinosa ................. G06F 21/62 |
| | | 726/28 |
| 2016/0210337 A1* | 7/2016 | Constandt .............. G16B 99/00 |

\* cited by examiner

PROTECTED SEARCH

CROSS REFERENCE TO RELATED APPLICATIONS

This application claims the benefit under 35 U.S.C. § 119(e) of U.S. Provisional Applications Ser. No. 62/434,237 filed Dec. 14, 2016, the content of which is incorporated by reference in its entirety into the present disclosure.

FIELD OF THE INVENTION

This disclosure relates to retrieving and presenting content.

BACKGROUND

Under conventional approaches, data may be secured using access controls that allow only authorized users to access the data. For example, access to a file may be restricted to one or more authorized users. Further, these authorized users may be granted various levels of authorization, such as the ability to read the file and/or the ability to write to the file.

SUMMARY

Various embodiments of the present disclosure can include systems, methods, and non-transitory computer readable media configured to perform protected search. A search query to be performed using at least one data store is received from a computing device of a user. The user is not authorized to access the at least one data store. One or more search results that are responsive to the search query from the at least one data store are determined. The one or more search results are aggregated based on one or more categories. At least a subset of the aggregated search results is provided to the computing device of the user.

In some embodiments, the systems, methods, and non-transitory computer readable media are configured to determine the search results using a system account that is authorized to access the at least one data store.

In some embodiments, the system account is defined in the instructions.

In some embodiments, the system account is not associated with the user.

In some embodiments, the one or more categories are pre-defined, and a category corresponds to an object property value.

In some embodiments, the systems, methods, and non-transitory computer readable media are configured to provide names of the one or more categories.

In some embodiments, the systems, methods, and non-transitory computer readable media are configured to provide aggregation numbers associated with the one or more categories, each aggregation number indicating a number of matches of the search query in the corresponding category.

In some embodiments, the systems, methods, and non-transitory computer readable media are configured to provide at least the subset of the aggregated search results based on a page size defined in the instructions.

In some embodiments, the systems, methods, and non-transitory computer readable media are configured to provide one or more user names of authorized accounts associated with at least one of the aggregated search results.

In some embodiments, the systems, methods, and non-transitory computer readable media are configured to provide one or more options for electronically contacting the users associated with the one or more authorized accounts.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Under conventional approaches, data may be secured using access controls that allow only authorized users to access the data. For example, access to a file may be restricted to one or more authorized users. Further, these authorized users may be granted various levels of authorization, such as the ability to read the file and/or the ability to write to the file.

Such conventional approaches for access control may not always be ideal. These conventional approaches may be particularly undesirable when individuals from segregated organizations (or segregated departments) are collaborating with one another. For example, an organization may want to grant users in a second department with the ability to perform searches on one or more data stores (e.g., databases) that are otherwise accessible to users in a first department. However, since these data stores may store confidential data that is intended to be accessible by only users in the first department, the organization may want to limit the amount of information that is exposed to users in the second department. In such situations, implementing conventional approaches for access control may not be ideal. For example, conventional approaches may require the creation of separate accounts for users in the second department. The access controls applied to the separate accounts will typically need to be managed carefully as the data stored in these restricted data stores evolves.

A claimed solution rooted in computer technology overcomes problems specifically arising in the realm of computer technology. In various embodiments, a computing system is configured to provide users with a search interface through which the users can submit queries to be performed on one or more restricted data stores. For example, the system can be configured to receive a user's search query through the search interface. The system can run this search query using a system account that is authorized to read the restricted data stores in full. In one example, the system account may be a user account that has been granted access to run queries against the restricted data stores (e.g., databases). The system can then obtain search results that are responsive to the user's search query. Since these search results may include confidential information that the user may not be authorized to see, in some embodiments, the system aggregates the search results based on at least one category (e.g., property value) associated with the search results. The system can then present information describing the aggregated search results through the search interface.

In one example, a user may submit a search query that includes the search terms "john doe" through the search interface. The system can run this search query against one or more restricted data stores. In this example, the search results responsive to the search query may include one or more objects (e.g., database objects, objects stored in an object model, documents, files, etc.) and each of these objects may be associated with a category "Case #513". Here, the system can aggregate the search results based on the category. The system can then present information describing these aggregated search results through the search interface. For example, the presented information can include a list of categories with which one or more responsive search results are associated along with a respective number of search results that are associated with the category. In the example above, the category "Case #513" can be shown in the search interface along with a value indicating the number of responsive search results that are associated with the category. By aggregating search results in this manner, the system is able to limit the amount of information that is provided to the user submitting the search query without having to reveal the details of those search results. Thus, in some embodiments, the system does not reveal sensitive information (e.g., object names) corresponding to the objects that were responsive to the user's search query.

Figure 1:
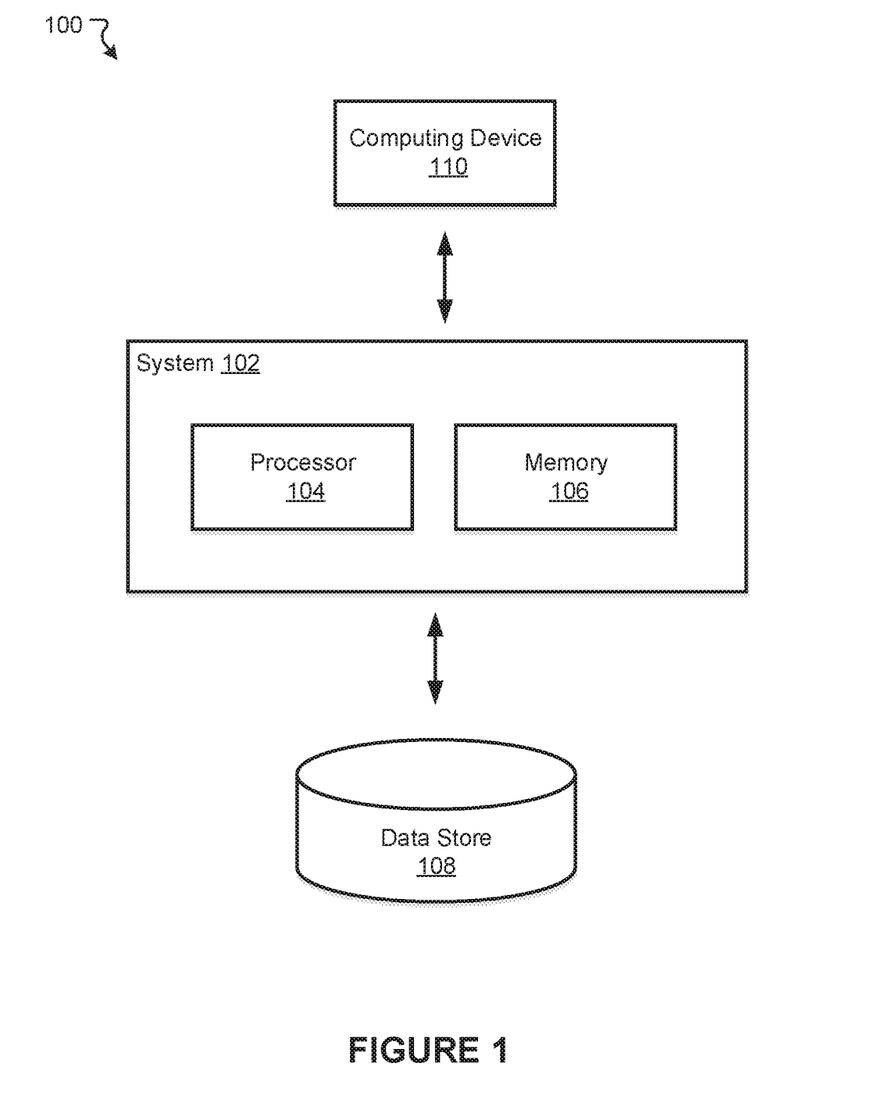
FIG. 1 illustrates an example environment for performing protected searches, in accordance with various embodiments.

FIG. 1 illustrates an example environment 100 for performing protected searches, in accordance with various embodiments. As shown in FIG. 1, the example environment 100 can include at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The environment 100 may also include a computing device 110 that is able to communicate with the system 102 (e.g., over one or more computer networks) and a data store 108 that is accessible to the system 102. For example, the data store 108 may include one or more searchable databases in which restricted data is stored.

In some embodiments, the system 102 and the computing device 110 may be integrated in a single device or system. Alternatively, the system 102 and the computing device 110 may be individual computing devices. For example, the computing device 110 may be a mobile device and the system 102 may be a computing server. The data store 108 may be accessible to the system 102, for example, through the memory 106, another device coupled to the system 102, cloud-based storage, etc. Various operations that are capable of being performed by the system 102 are described below in reference to FIGS. 2-4.

Figure 2:
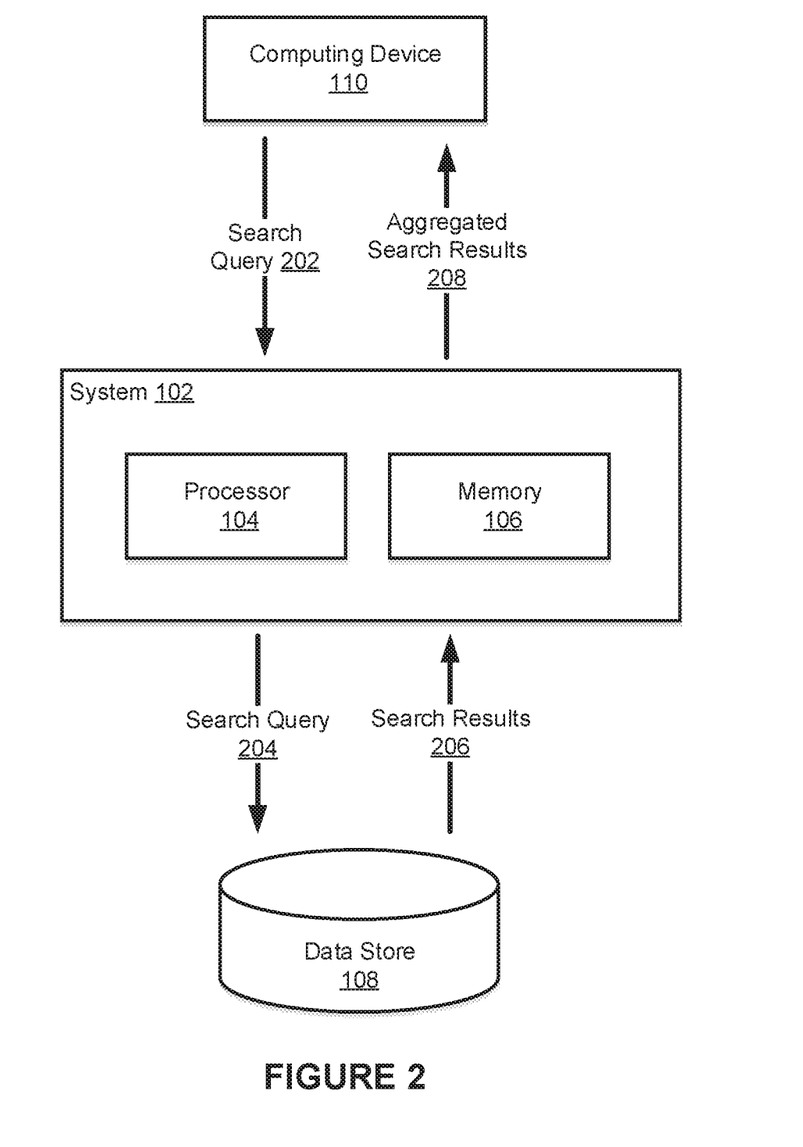
FIG. 2 illustrates an example system for performing protected searches, in accordance with various embodiments.

FIG. 2 illustrates an example system for performing protected searches, in accordance with various embodiments. The operations shown in FIG. 2 and described below are intended to be illustrative.

In various embodiments, a user may operate a computing device 110 to search for data by submitting a search query 202. In some embodiments, the search query 202 may be submitted through a search interface that is provided by the system 102. The search query 202 may be received by the system 102. The search query may be performed using at least one data store, such as the data store 108, which the user is typically not authorized to access. In some embodiments, the system 102 can submit the search query 202 to the data store 108 and the data store 108 can provide the system 102 with a set of search results 206 that are responsive to the search query 202. For example, these search results 206 can each reference an object stored in the data store 108 that is responsive to one or more search terms included in the search query 202. In some embodiments, when executing the search query 202, the system 102 can be configured to search the data store 108 for objects that are responsive to the search query 202 and these objects can be organized into a set of search results 206. In various embodiments, the set of search results 206 are determined using an account that has been granted appropriate permissions to read the data store 108 (e.g., system account, dummy account, administrative account, or any account that has been specifically granted permissions to run searches that are submitted through the search interface, etc.). In such embodiments, the account used to perform the search is not affiliated with the user that submitted the search query 202.

The system 102 can aggregate the set of search results 206 based on one or more specified categories. In some embodiments, the aggregation involves collapsing (or organizing) a set of search results into groups based on the respective category associated with the search result. For example, a first search result and a second search result that have the same category value can be assigned to the same group. In various embodiments, the category (or categories) used to aggregate the search results 206 can correspond to some property value or attribute that is associated with the respective objects referenced by the search results 206. In one example, the category can correspond to a database table column (e.g., a docket number column, group identifier, etc.). In this example, rows in the database table that are responsive to a search query can be aggregated based on their respective values that correspond to the database table column. In another example, the category can correspond to a property (e.g., case number) associated with objects in an object model. In yet another example, the category can correspond to an object type (e.g., file type, document type, etc.). In some embodiments, the category used to aggregate the search results 206 is specified by a user or administrator (e.g., the user that submitted the search query 202).

Once aggregated, the system can provide information describing the aggregated search results 208 to the computing device 110. In some embodiments, the information describing the aggregated search results 208 is provided through the search interface through which the search query 202 was submitted. In various embodiments, the information describing the aggregated search results 208 includes names of the one or more categories that were used to aggregate the search results 206 and, for each category, a respective number of search results 206 that correspond to the category. The system may also provide at least the subset of the aggregated search results 208 based on a page size defined in the instructions. For example, the number of aggregated search results provided on an interface may be limited by a defined page size. As a result, the user that submitted the search query 202 is able to view generalized information describing the aggregated search results 208 without being able to view details corresponding to the individual search results 206. More details describing the search interface and presentation of the information describing the aggregated search results 208 are provided below in reference to FIG. 3.

Further, the provided search results may respectively include authorized accounts, so that the user can find contacts to obtain the details of the individual search results 206. In various embodiments, to provide at least the subset of the aggregated search results 208 to the computing device 110, the system 102 may provide user names of one or more authorized accounts associated with at least one of the aggregated search results at the computing device 110. As such, the analyst may refer to a provided authorized account to apply for access authorization to detailed data, if not already authorized to retrieve the detailed data.

Figure 3:
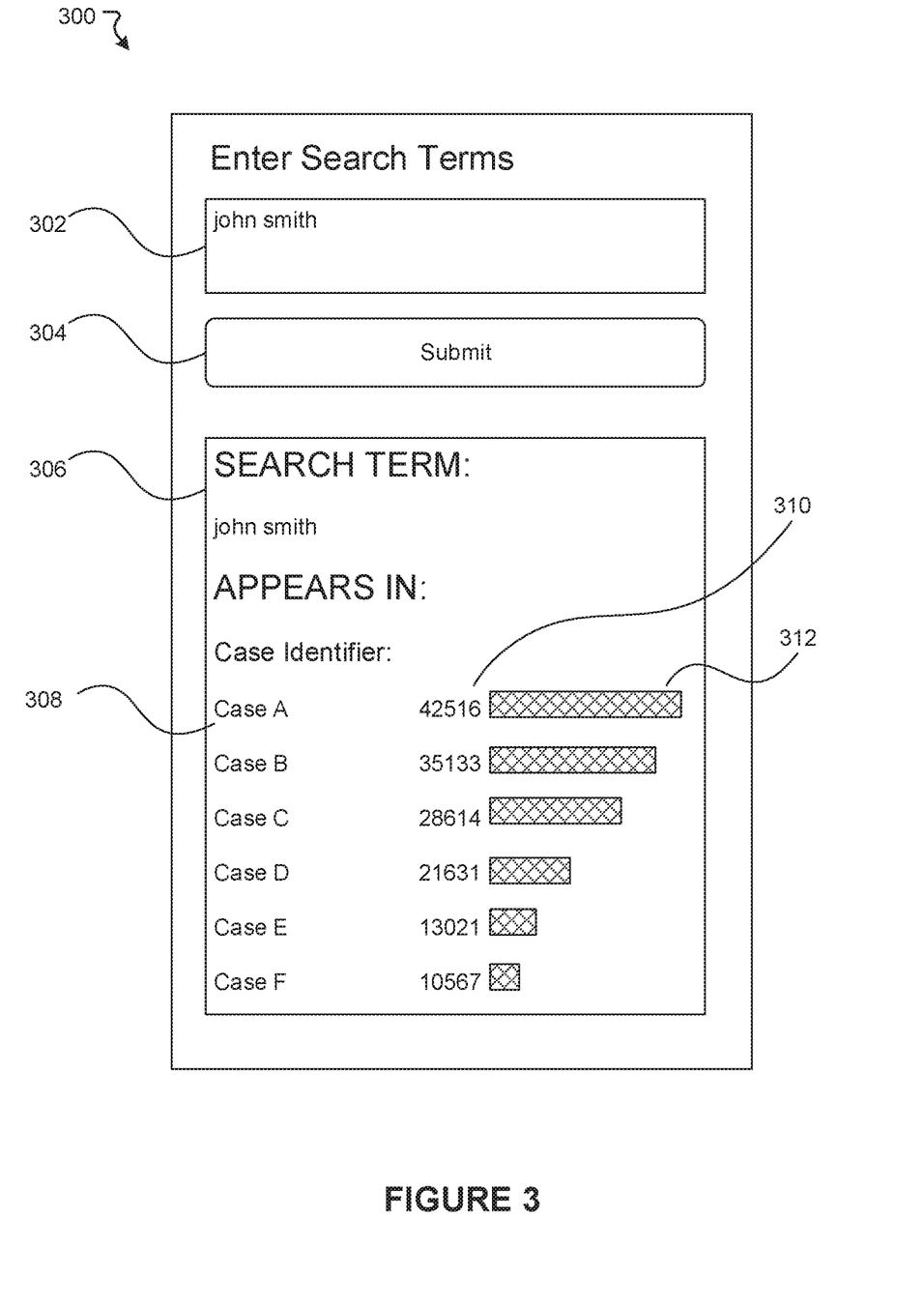
FIG. 3 illustrates an example search interface for performing protected searches, in accordance with various embodiments.

FIG. 3 illustrates an example search interface 300 for performing protected searches, in accordance with various embodiments. The interface 300 may be provided by a computing system (e.g., the system 102) and accessed by a computing device (e.g., the computing device 110).

In various embodiments, a user operating the computing device can enter one or more search terms (e.g., "john smith") into a search field 302. The user can then select an option 304 to submit a search query that includes the inputted search terms (e.g., "john smith") to the computing system. The computing system can determine a set of search results that are responsive to the search query. Each of these search results can reference an object stored in one or more data stores that is responsive to the search query (e.g., "john smith"). In various embodiments, the computing system can aggregate the search results, as described above. Once aggregated, the computing system can provide information describing the aggregated search results in a region 306 of the interface 300. In the example of FIG. 3, the search results were aggregated using a "case identifier" category. For example, the respective objects referenced by the search results may each be associated with some value that corresponds to the "case identifier" category. In this example, objects that share "case identifier" values can be aggregated. Thus, for example, objects referenced by the search results that have a "case identifier" value of "Case A" can be aggregated. The information describing the aggregated search results can be presented through the search interface 300 as shown. In one example, the search interface 300 provides information describing aggregated search results that share the "case identifier" value of "Case A" 308. The search interface 300 also indicates the respective number of search results 310 that share the "case identifier" value of "Case A" and that are responsive to the search query (e.g., "john smith"). In some embodiments, the search interface 300 can also provide a histogram 312 that plots the respective number of search results that share a given "case identifier" value. In some embodiments, the information provided in the search interface 300 can include a subset of the search results such as the name and user account that is associated with a given search result. In general, the aggregated search results can be displayed in any order, such as a descending match order. Further, not all aggregated search results need be displayed in the search interface 300. Rather, in some instances, the number of aggregated search results to be displayed in the search interface 300 can be pre-defined (e.g., display only the top 6 aggregated search results).

Figure 4:
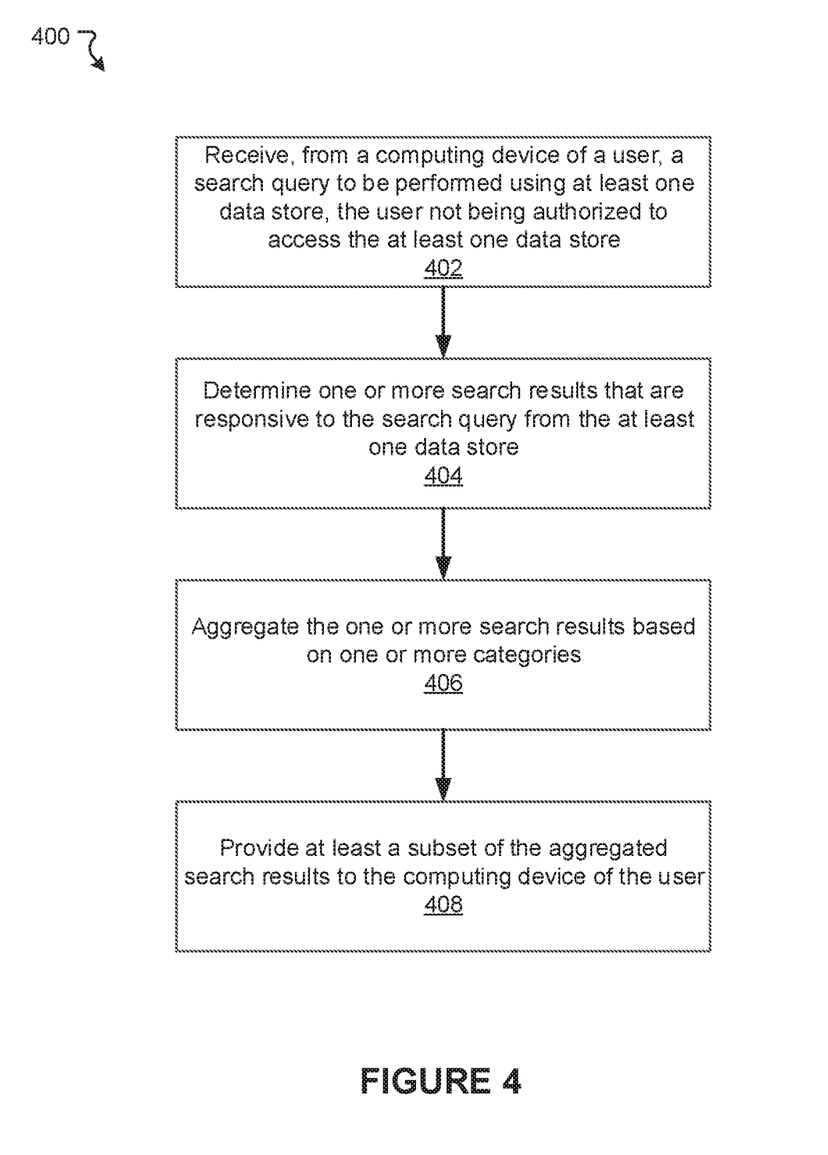
FIG. 4 illustrates a flowchart of an example method, in accordance with various embodiments.

FIG. 4 illustrates a flowchart of an example method 400, according to various embodiments of the present disclosure. The method 400 may be implemented in various environments as described above. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a search query to be performed using at least one data store is received from a computing device of a user. The user is not authorized to access the at least one data store. At block 404, one or more search results that are responsive to the search query are determined from the at least one data store. At block 406, the one or more search results are aggregated based on one or more categories. At block 408, at least a subset of the aggregated search results is provided to the computing device of the user.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
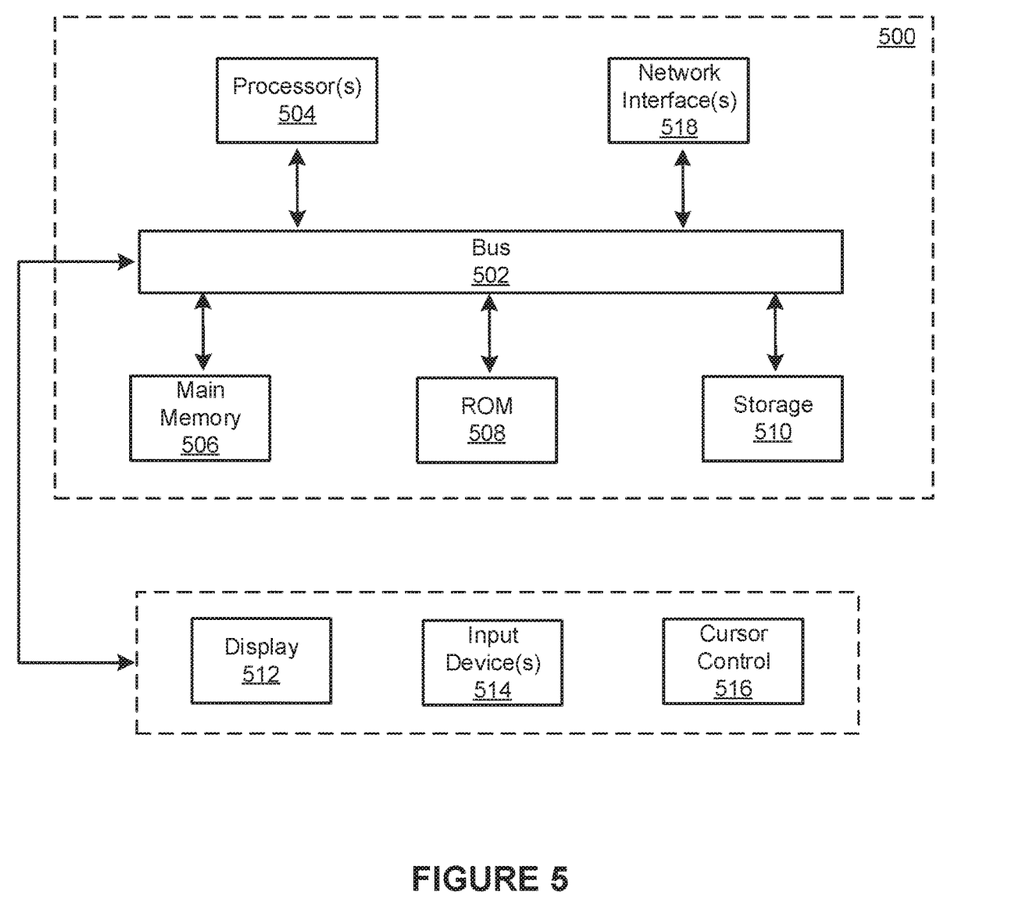
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
memory storing instructions that, when executed by the one or more processors, cause the system to perform;
receiving, from a computing device of a user, a search query to be performed using at least one data store, the user not being authorized to access the at least one data store, wherein the search query includes one or more search terms;
determining one or more search results that are responsive to the search query from the at least one data store, wherein the search query is performed using a system account that is authorized to access the at least one data store;
aggregating the one or more search results based on one or more categories;
providing at least a subset of the aggregated search results to the computing device of the user in response to the search query, at least one search result of the subset of the aggregated search results including a plurality of account usernames, each of the plurality of account usernames corresponding to a different authorized account capable of accessing one or more details of the at least one search result of the subset of the aggregated search results, the different authorized accounts being different from the system account, wherein the providing at least a subset of the aggregated search results to the computing device of the user further comprises providing aggregation numbers associated with the one or more categories, each aggregation number indicating a number of matches of the search query in a corresponding category of the one or more categories;
providing, based on the aggregation numbers associated with the one or more categories, at least one histogram that plots the aggregation numbers indicating the number of matches of the search query in the corresponding category of the one or more categories;
receiving, from the computing device of the user, a selection of a particular account username of the plurality of account usernames; and
contacting, based on the particular account username of the plurality of account usernames, at least one user associated with the authorized account corresponding to the particular account username to obtain the one or more details of the at least one search result of the subset of the aggregated search results.

2. The system of claim 1, wherein the system account is defined in the instructions.

3. The system of claim 1, wherein the one or more categories are pre-defined, and wherein a category corresponds to an object property value.

4. The system of claim 1, wherein providing at least the subset of the aggregated search results to the computing device of the user comprises providing names of the one or more categories.

5. The system of claim 4, wherein providing at least the subset of the aggregated search results to the computing device of the user further comprises providing at least the subset of the aggregated search results based on a page size defined in the instructions.

6. The system of claim 1, wherein the one or more identifiers of the one or more authorized account comprise one or more user names of the one or more authorized accounts.

7. A method being implemented by a computing system including one or more physical processors and storage media storing machine-readable instructions, the method comprising:
receiving, from a computing device of a user, a search query to be performed using at least one data store, the user not being authorized to access the at least one data store, wherein the search query includes one or more search terms;

determining one or more search results that are responsive to the search query from the at least one data store, wherein the search query is performed using a system account that is authorized to access the at least one data store;

aggregating the one or more search results based on one or more categories;

providing at least a subset of the aggregated search results to the computing device of the user in response to the search query, at least one search result of the subset of the aggregated search results including a plurality of account usernames, each of the plurality of account usernames corresponding to a different authorized account capable of accessing one or more details of the at least one search result of the subset of the aggregated search results, the different authorized accounts being different from the system account, wherein the providing at least a subset of the aggregated search results to the computing device of the user further comprises providing aggregation numbers associated with the one or more categories, each aggregation number indicating a number of matches of the search query in a corresponding category of the one or more categories;

providing, based on the aggregation numbers associated with the one or more categories, at least one histogram that plots the aggregation numbers indicating the number of matches of the search query in the corresponding category of the one or more categories;

receiving, from the computing device of the user, a selection of a particular account username of the plurality of account usernames; and contacting, based on the particular account username of the plurality of account usernames, at least one user associated with the authorized account corresponding to the particular account username to obtain the one or more details of the at least one search result of the subset of the aggregated search results.

8. The method of claim 7, wherein the system account is defined in the instructions.

9. The method of claim 7, wherein the one or more categories are pre-defined, and wherein a category corresponds to an object property value.

10. The method of claim 7, wherein providing at least the subset of the aggregated search results to the computing device of the user comprises providing names of the one or more categories.

11. The method of claim 10, wherein providing at least the subset of the aggregated search results to the computing device of the user further comprises providing at least the subset of the aggregated search results based on a page size defined in the instructions.

12. The method of claim 7, wherein the one or more identifiers of the one or more authorized account comprise one or more user names of the one or more authorized accounts.

13. A non-transitory computer readable medium comprising instructions that, when executed, cause one or more processors to perform:

receiving, from a computing device of a user, a search query to be performed using at least one data store, the user not being authorized to access the at least one data store, wherein the search query includes one or more search terms;

determining one or more search results that are responsive to the search query from the at least one data store, wherein the search query is performed using a system account that is authorized to access the at least one data store;

aggregating the one or more search results based on one or more categories;

providing at least a subset of the aggregated search results to the computing device of the user in response to the search query, at least one search result of the subset of the aggregated search results including a plurality of account usernames, each of the plurality of account usernames corresponding to a different authorized account capable of accessing one or more details of the at least one search result of the subset of the aggregated search results, the different authorized accounts being different from the system account, wherein the providing at least a subset of the aggregated search results to the computing device of the user further comprises providing aggregation numbers associated with the one or more categories, each aggregation number indicating a number of matches of the search query in a corresponding category of the one or more categories;

providing, based on the aggregation numbers associated with the one or more categories, at least one histogram that plots the aggregation numbers indicating the number of matches of the search query in the corresponding category of the one or more categories;

receiving, from the computing device of the user, a selection of a particular account username of the plurality of account usernames; and contacting, based on the particular account username of the plurality of account usernames, at least one user associated with the authorized account corresponding to the particular account username to obtain the one or more details of the at least one search result of the subset of the aggregated search results.

\* \* \* \* \*